UNITED STATES PATENT OFFICE 2,424,667

HALOGENATED HYDROCARBONS

Maynard Stanley Raasch, Wilmington, Del., assignor to E. I. du Pont de Nemours & Company, Wilmington, Del., a corporation of Delaware No Drawing. Application April 19, 1946, Serial No. 663,607

7 Claims. (Cl. 260—653)

This invention is concerned with a new fluorine compound and its preparation.

The addition of iodine to ethylene to form 1,2-diiodoethane has long been known. However, attempts to add iodine to polyhalogenated ethylenes have been unsuccessful. For example, Hofmann and Kirmreuther, Ber. 42, 4482 (1909) state that iodine does not add to di-, tri-, or tetrachloroethylene. Attempts to add iodine to tetrafluoroethylene by passing tetrafluoroethylene at atmospheric pressure into an alcoholic solution of iodine were unsuccessful.

This invention has as an object the preparation of symmetrical diiodotetrafluoroethane. A further object is the provision of a process for obtaining said compound by the addition of iodine to tetrafluoroethylene. Other objects will appear hereafter.

These objects are accomplished by the present invention wherein iodine is reacted with tetrafluoroethylene under pressures of at least 25 lbs./sq. in. and at a temperature of 20° to 150° C. to form s-diiodotetrafluoroethane which is a new composition of matter.

The general procedure for carrying out the process of this invention is as follows: A pressure vessel is charged with iodine and, if desired, a solvent, to facilitate temperature control and contact of the reagents. The pressure vessel is then either (1) cooled in a suitable cooling mixture, evacuated and charged with a suitable amount of tetrafluoroethylene, or (2) kept under pressure with tetrafluoroethylene from a cylinder until substantially no more of the gas is absorbed. The reaction vessel may be maintained at a moderate temperature to increase the speed of the reaction. After termination of the reaction, the product is washed free from iodine, dried, and distilled to purify it and free it from solvent if one was used. The following example, wherein the proportions are in parts by weight, is illustrative of the invention.

Example

One hundred parts of iodine and one hundred parts of anhydrous ether were charged into a silver-lined pressure vessel equipped with an inlet tube and having about twice the volume of the above ingredients. The vessel was cooled in a mixture of dry ice and methanol and evacuated to remove air. The inlet tube was then connected to a cylinder of tetrafluoroethylene and the reaction vessel was maintained under a tetrafluoroethylene pressure of about 300 lbs./sq. in. and at a temperature of 60° C. for 15 hours. At the end of this time, the reaction vessel was cooled, the gas bled off, and the product removed. The product was filtered, washed with sodium thiosulfate solution to remove unreacted iodine, dried over sodium sulfate, and distilled. The ether first distilled off, and then 102 parts of product distilling at 51° C. at a pressure of 110 mm. of mercury, or at 27° C. at 33 mm., was obtained. The product distilled at 112–113° C. at atmospheric pressure but it is preferred to distill it under reduced pressure as less color then develops from the presence of iodine formed in small amounts from the dissociation of the product. Fluorine and iodine analyses show the product to be s-diiodotetrafluoroethane. The product had a density of 2.6293 at 25° C. and a refractive index of 1.4895 at 25° C. with the D line of sodium.

Although the preparation of s-diiodotetrafluoroethane is illustrated by heating a mixture of tetrafluoroethylene and iodine dissolved in ether at a selected temperature and pressure, the conditions under which the process of this invention may be practiced are capable of considerable variation. Appreciable yields of s-diiodotetrafluoroethane are obtained when the temperature employed is as low as 20° C. and when it is as high as 150° C. However, temperatures above 150° C. are undesirable since at higher temperatures appreciable quantities of a secondary reaction product are obtained. Optimum yields of s-diiodotetrafluoroethane are obtained when the temperature employed is within the range of 40° to 125° C. This invention may be practiced at superatmospheric pressure above 25 lbs./sq. in. It is however, desirable to employ pressures below 2000 lbs./sq. in. since ordinary commercial equipment can be employed within this range. In general, pressures within the range of 50 to 1000 lbs./sq. in. are employed because of the superior yields obtained thereby. A portion of the pressure may be obtained with an inert gas such as nitrogen.

To obtain appreciable yields of product, it is desirable to employ an amount of iodine at least equivalent to the weight of the tetrafluoroethylene used. However, for maximum yields of product equimolecular quantities of reactants should be used.

Although the use of a solvent is not necessary in the practice of this invention, it is desirable to employ a solvent for the iodine in the reaction mixture in order to facilitate maximum contact of the reactants. Solvents other than ether used in the working example can be employed. Examples of suitable solvents include ethers, such as diethyl ether, dibutyl ether, etc.; aromatic and aliphatic hydrocarbons, such as benzene, toluene and naphtha; halogenated aliphatic hydrocarbons, for example, chloroform, carbon tetrachloride and methylene chloride; alcohols such as methyl alcohol, ethyl alcohol, isopropyl alcohol, and butyl alcohol; etc. For ease in isolating the s-diiodotetrafluoroethane, it is desirable to use a medium with a boiling point markedly different from that of the diiodotetrafluoroethane so that the latter may easily be separated from the solvent by distillation. Of the solvent is miscible with water, the solvent may be washed out of the product. The product may be freed of unreacted iodine by washing with a variety of solutions which react with iodine, e. g., alkaline ones such as sodium carbonate solution, or reducing solutions such as those containing ferrous salts, or sulfites or hydrosulfites of light metals, or the iodine may be removed from the product by shaking it with metallic mercury.

The reaction is preferably carried out under non-polymerizing conditions, and with this purpose it is preferred to exclude oxygen from the reaction, as oxygen may cause some of the tetrafluoroethylene to polymerize. The preparation of the product may be carried out in vessels made of common materials of construction such as glass, vitreous enamel, iron, stainless steel or silver, the limitation being that they withstand the pressures employed. The preparation may be readily adapted to a continuous process instead of a batch process by passing tetrafluoroethylene under pressure and a solution of iodine through a tubular reactor in a continuous manner.

s-Diiodotetrafluoroethane may be used as a polymerization modifier, particularly for diene polymerizations such as butadiene and chloroprene polymerizations and copolymerizations with each other or with styrene, acrylonitrile or other suitable monomers. The compound is also useful as a chemical intermediate in replacement reactions involving the iodine atoms.

The foregoing detailed description has been given for clearness of understanding only and no unnecessary limitations should be understood therefrom. The invention is not limited to the exact details shown and described for obvious modifications will occur to a person skilled in the art.

What is claimed is:

1. Symmetrical diiodotetrafluoroethane.
2. Process for the preparation of s-diiodotetrafluoroethane which comprises bringing iodine, dissolved in diethyl ether, in contact with an approximately equal weight of tetrafluoroethylene at 60° C. and a tetrafluoroethylene pressure of 300 lbs./sq. in. and, after 15 hours of contact, isolating the s-diiodotetrafluoroethane.
3. Process for the preparation of s-diiodotetrafluoroethane which comprises bringing iodine dissolved in an inert solvent therefor, in contact with an approximately equimolecular amount of tetrafluoroethylene at 40–125° C. and 50–1000 lbs./sq. in. tetrafluoroethylene pressure and isolating the s-diiodotetrafluoroethane.
4. Process for the preparation of s-diiodotetrafluoroethane which comprises bringing iodine in contact with an approximately equimolecular amount of tetrafluoroethylene at 40–125° C. and 50–1000 lbs./sq. in. tetrafluoroethylene pressure and isolating the s-diiodotetrafluoroethane.
5. Process for the preparation of s-diiodotetrafluoroethane which comprises bringing iodine in contact with an approximately equimolecular amount of tetrafluoroethylene at 20–150° C. and 25–2000 lbs./sq. in. and isolating the s-diiodotetrafluoroethane.
6. Process for the preparation of s-diiodotetrafluoroethane which comprises reacting tetrafluoroethylene with at least about its own weight of iodine at a pressure of at least 25 lbs./sq. in. at a temperature within the range 20–150° C. and isolating the s-diiodotetrafluoroethane.
7. Process of claim 6 wherein an inert solvent for the iodine is employed.

MAYNARD STANLEY RAASCH.

REFERENCES CITED

The following references are of record in the file of this patent:

Locke et al., Jour. Am. Chem. Soc., vol. 56, pp. 1726–1728 (1934).

Henne, "Organic Reactions," vol. II, New York (1944), pp. 55 and 79.